(12) United States Patent
Capodivacca (10) Patent No.: US 9,148,918 B2
(45) Date of Patent: Sep. 29, 2015

(54) FEEDFORWARD CIRCUIT FOR FAST ANALOG DIMMING IN LED DRIVERS

(71) Applicant: Infineon Technologies AG, Neubiberg (DE)

(72) Inventor: Giovanni Capodivacca, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/097,027

(22) Filed: Dec. 4, 2013

(65) Prior Publication Data

US 2015/0156834 A1 Jun. 4, 2015

(51) Int. Cl.
*H05B 37/00* (2006.01)
*H05B 33/08* (2006.01)
*H02M 3/158* (2006.01)

(52) U.S. Cl.
CPC ........... *H05B 33/0815* (2013.01); *H02M 3/158* (2013.01); *H02M 3/1582* (2013.01)

(58) Field of Classification Search
CPC .............................. H05B 37/02; G05F 1/575
USPC .......... 315/312, 307, 291; 323/280, 281, 282, 323/284, 285, 289, 290
See application file for complete search history.

(56) References Cited

U.S. PATENT DOCUMENTS

| | | | |
|---|---|---|---|
| 5,961,857 A | 10/1999 | Takahashi et al. | |
| 6,728,178 B2 | 4/2004 | Koishi et al. | |
| 6,741,041 B2 | 5/2004 | Tateishi et al. | |
| 7,358,706 B2 | 4/2008 | Lys | |
| 8,305,004 B2 | 11/2012 | Shao | |
| 2008/0238387 A1* | 10/2008 | Schmeller et al. | 323/282 |
| 2011/0057564 A1 | 3/2011 | Otake | |
| 2012/0229046 A1 | 9/2012 | Melanson | |
| 2013/0009557 A1* | 1/2013 | Szczeszynski | 315/186 |
| 2014/0132236 A1* | 5/2014 | Darmawaskita et al. | 323/283 |

FOREIGN PATENT DOCUMENTS

EP 0680121 A1 11/1995
WO 2009059772 A1 5/2009

* cited by examiner

*Primary Examiner* — Minh D A
(74) *Attorney, Agent, or Firm* — Shumaker & Sieffert, P.A.

(57) ABSTRACT

Methods, devices, and circuits are disclosed delivering a first level of output current to one or more loads in a buck-boost converter comprising an inductor. The methods, devices, and circuits may further be disclosed applying, in response to an indication of an altered output current requirement to one or more loads in a buck-boost converter comprising an inductor, a change in a supplied reference voltage to one or more elements including a feedforward control element, wherein applying the change in the supplied reference voltage to the feedforward control element causes an adjustment of the output current from the first level to a second level corresponding to the altered current output requirement.

23 Claims, 5 Drawing Sheets

FEEDFORWARD CIRCUIT FOR FAST ANALOG DIMMING IN LED DRIVERS

TECHNICAL FIELD

The disclosure relates to electrical control circuits, and in particular, feedforward control circuits.

BACKGROUND

Control circuits may be used to control the amount of current flowing through loads with specific current and/or voltage requirements, such as chains of light-emitting diodes (LEDs). The light intensity of an LED chain is controlled by the amount of current flowing through it. Generally, a closed loop current generator may be used to keep the current constant. For lighting with a high current load, switched-mode controllers may be used. In applications that demand high efficiency and high flexibility, such as in some automotive lighting applications, buck, boost, or buck-boost DC/DC converter topologies may be used. Some applications in automotive lighting or other applications involve multiple LED chains connected in parallel. The number may vary depending on the specific application. One or more of the LED chains can be switched on or off at times (e.g. connected or disconnected from the circuit). This change in the number of LED chains means the constant current may sink through fewer or additional chains. A control circuit may control the current flowing through the LED chain or chains as different numbers of the chains are connected or disconnected.

SUMMARY

In general, the various examples of this disclosure are directed to switched mode converters, such as current mode controlled buck-boost DC converters with feedforward control elements, and the concept may be applied in buck, boost, and buck-boost configurations. Various examples of this disclosure may adjust a supplied reference voltage to a feedforward control element in order to change the output current flowing through one or more connected loads. The use of a feedforward control element may enhance the capability of the converters in reaching the desired level of output current to the one or more loads, thereby allowing for fast switching (e.g. connecting and disconnecting) of the loads in a safe manner, among other advantages.

One example is directed to a method that includes delivering a first level of output current to one or more loads in a switched mode converter comprising an inductor, and applying, in response to an indication of an altered output current requirement to one or more loads in the switched mode converter comprising an inductor, a change in a supplied reference voltage to one or more elements including a feedforward control element comprising an error amplifier, wherein applying the change in the supplied reference voltage to the feedforward control element causes an adjustment of the output current from the first level to a second level corresponding to the altered current output requirement.

Another example is directed to a device which comprises a feedforward control element. The device may further comprise one or more components configured to apply, in response to an indication of an altered output current requirement of one or more loads in a switched mode converter comprising an inductor, a change in a supplied reference voltage to one or more elements including the feedforward control element, wherein when the one or more components apply a change in the supplied reference voltage to the feedforward control element, the feedforward control element causes an adjustment of an output current from a first level to a second level corresponding to the altered current output requirement.

Another example is directed to a circuit that includes a feedforward control element. The circuit may further comprise one or more components configured to apply, in response to an indication of an altered output current requirement of one or more loads in a switched mode converter comprising an inductor, a change in a supplied reference voltage to one or more elements including the feedforward control element, wherein when the one or more components apply a change in the supplied reference voltage to the feedforward control element, the feedforward control element causes an adjustment of an output current level from a first current level to a second current level corresponding to the altered current output requirement.

The details of one or more examples of the techniques of this disclosure are set forth in the accompanying drawings and the description below. Other features, objects, and advantages of the techniques will be apparent from the description and drawings, and from the claims.

DETAILED DESCRIPTION

A wide variety of applications, such as automotive applications and other applications may implement a number of LED strings connected in parallel, for example as part of a headlight or taillight assembly of a vehicle. The current flowing through each LED chain (and each LED within each chain) corresponds directly to the brightness of the LEDs. In some applications, it may be beneficial to allow for adjustment of the number of connected LED chains (e.g. to provide greater or lesser illumination). For example, in some automotive applications, a relatively smaller number of LED chains may be connected to a controlled output current and provide some relatively small amount of illumination, such as when the headlights are on in a "running light" configuration. At other times, additional LED chains may be connected to provide additional illumination (and connected to a relatively higher output current), such as when the headlights in a fully "on" configuration. Similar LED control may also be desirable for use in other applications or any environment where LEDs are used to provide variable lighting than can change over time.

However, some issues may arise when connecting or disconnecting LED chains, such as in a vehicular headlight or taillight assembly or other variable lighting application. For example, connecting additional LED chains may produce an initial noticeable decrease in brightness of the LEDs as the supplied output current is initially split up over a greater number of LED chains. This initial reduction in brightness may then decrease as the controller ramps up the supplied output current to account for the addition of the LED chains. In another example, when disconnecting LED chains, there may be a noticeable increase in brightness of the still-connected LED chains as the supplied current is then initially split up between relatively fewer LED chains. As the controller operates to decrease the level of supplied output current to the LED chains, the brightness level of the individual LEDs will decrease. In some cases, this sudden increase in current flowing through the still-connected LED chains can damage the LEDs, such as if the current exceeds the physical tolerance or safe limits of the LEDs.

Some solutions to these problems may operate to decrease or increase the supplied output current to the LED chains before connecting or disconnecting the LED chains. For example, suppose four LED chains are connected in parallel and are supplied by an output current of four amps such that a constant one amp of current flows through each LED chain. As an example, if it is desired to disconnect three of the four LED chains, some current control circuits may reduce the supplied output current to one amp until only one-quarter amp of current flows through each LED chain before disconnecting any of the LED chains. Accordingly, once the supplied output current has been reduced, the control circuit may then send a signal to disconnect the LED chains. This solution may be effective to help avoid overcurrent to the LED chain. However, this reduction in output current may also produce a momentary undesirable reduction in the brightness of the LEDs.

Many of the below described examples of switched mode converters, specifically current mode controlled buck-boost converters include LED chains as examples of applicable loads, such as loads with variable current requirements that may be strongly affected by varying currents. Buck-boost converter 100, in accordance with this disclosure, may also be used in any other application involving supplying current to a load with variable current requirements. As such, the examples of LED chains as used herein should not be construed as limiting the techniques of the present disclosure to LED chains.

Figure 1:
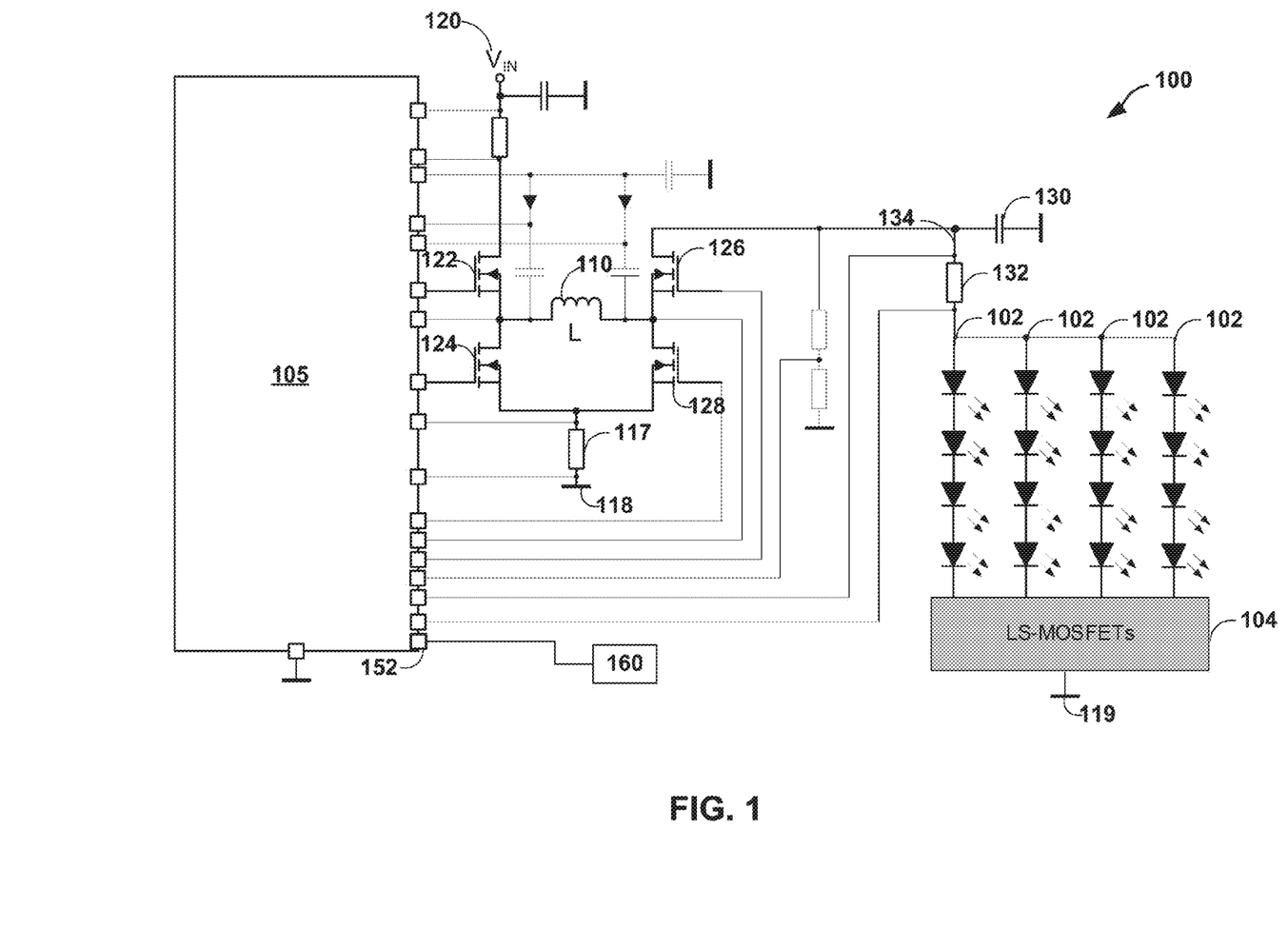
FIG. 1 is a block diagram illustrating one example of a switched mode converter, specifically a buck-boost converter and LED chain assemblies, in accordance with an example of this disclosure.

FIG. 1 is a block diagram illustrating one example of a switched mode converter, specifically, current mode controlled buck-boost converter 100 and LED chain assemblies 102, in accordance with one example of this disclosure. The switched mode converter may include current mode controlled buck-boost converter 100, in buck, boost, or buck-boost configuration, and may also include any other configuration of a switched mode converter. LED chain assemblies 102 may be connected to LS-MOSFETS 104. LS-MOSFETS 104 is connected to ground 119 and may operate to switch each individual LED chain assembly 102 to be connected or disconnected to ground 119, thereby allowing (connected to ground 119) or preventing (disconnected from ground 119) current from flowing through each LED chain assembly 102. In this manner LS-MOSFETS 104 may control whether each individual LED chain assembly 102 has current flowing through the chain and therefore whether the LEDs within each LED chain assembly 102 are providing illumination. Buck-boost converter 100 includes an input voltage 120 along with an output voltage 134 coupled to LED chain assemblies 102 through output resistor 132. Buck-boost converter 100 also includes an inductor 110, and switches 122, 124, 126, and 128 coupled to inductor 110 in such a way as to apply different circuit connections across inductor 110. Buck-boost converter 100 further includes filtering capacitor 130 and output resistor 132 coupled to output voltage 134. Buck-boost converter 100 further comprises feedforward control element 160, coupled to controller 105 through connection 152, in this illustrative example. Feedforward control element 160 may enable fast adjustments to the current flowing through output resistor 132 (which may be termed the output current) and through any connected LED chain assemblies 102 so as to allow for fast switching of LED chain assemblies 102 without noticeable dimming or damage to any of the LEDs. Feedforward control element 160 is further described below in accordance with various illustrative examples.

Any switches in this disclosure, such as switches 122, 124, 126, and 128, or LS-MOSFETS 104, may be implemented as diodes or transistors. The transistors may comprise bipolar junction transistors (BJTs), junction gate field-effect transistors (JFETs), metal-oxide-semiconductor field-effect transistors (MOSFETs), insulated gate bipolar transistors (IGBTs), or other types of transistors.

In some examples, the switches might be made from various materials, having semiconducting properties. In some examples, the switches (e.g., transistors, diodes) may be certain pure elements found in group IV of the periodic table such as silicon and germanium. In some examples, the switches (e.g., transistors, diodes) may be binary compounds, particularly between elements in groups III and V, such as gallium arsenide or gallium nitride, groups II and VI, groups IV and VI, and between different group IV elements, e.g. silicon carbide; as well as certain ternary compounds, oxides and alloys. In some examples, the switches (e.g., transistors, diodes) may be organic semiconductors, made of organic compounds. Additionally, in some examples, switches may include asynchronous Switched Mode Power Supply (SMPS). In some examples, switches 122, 124, 126, and 128 may be diodes. Similarly to the transistors discussed above, these diodes might also be made from various materials, having semiconducting properties, e.g., silicon, germanium, gallium arsenide, gallium nitride, silicon carbide, and the like.

In various examples of this disclosure, in a steady state where a desired level of output voltage is to be maintained, buck-boost converter 100 may operate to alternately open and close various switches 122, 124, 126, and 128 to produce differing connections between output resistor 132 and inductor 110. For example, in a first configuration, switches 122, 124, 126, and 128 may be configured so as to allow current to flow from input voltage 120 through inductor 110 and to output resistor 132. In this first position, switch 122 and 126 may be in a closed position (allowing current to flow through the switches), whereas switches 124 and 128 may be in an open position (not allowing current to flow through the switches). Input voltage 120 drives current through inductor 110, output resistor 132, and ultimately through any connected LED assemblies 102 when buck-boost converter 100 is operating in this first configuration. While the current flowing through inductor 110 is driven by input voltage 120, inductor 110 may store energy in the form of a magnetic field.

Controller 105 may maintain this first switch configuration for a predetermined amount of time, or until a predetermined level of current is detected flowing through inductor 110, or until output voltage 134 reaches a predetermined level. In order to sense output voltage 134 or the current through inductor 110, buck-boost converter 100 may include additional circuitry, such as current sensing circuitry or voltage sensing circuitry. Accordingly, at a particular point, controller 105 will change the open and closed positions of switches 122, 124, 126, and 128 into a second configuration. In this second configuration, controller 105 may operate to change switch 122 into the open position and change switch 124 into the closed position. In this configuration, output resistor 132 may be connected to inductor 110 and ground 118 through sense resistor 117. Additionally, inductor 110 may have accumulated energy in the form of a magnetic field from having been in the first configuration. In accordance with physics of inductors, the stored energy in the inductor may operate to produce a current flow through inductor 110, and consequently through sense resistor 117. In this configuration, inductor 110 may drive current to output resistor 132 and any connected LED assemblies 102. During this second configuration, the amount of current flowing through sense resistor 117 is the same amount of current flowing through output resistor 132.

As inductor 110 continues to supply a current, the stored energy in inductor 110 decreases. This decrease in stored energy results in a decrease in the amount of supplied current, which drops the level of output voltage 134. Once output voltage 134 has dropped to a predetermined level or the current through inductor 110 has dropped below a predetermined amount, controller 105 may operate to switch switches 122, 124, 126, and 128 back to the first configuration, thereby allowing input voltage 120 to drive current to output resistor 132 and to charge up the energy stored in inductor 110.

In accordance with the above description regarding the switching of the buck configuration of the buck-boost converter 100, it should be understood that additional switching embodiments are available for boost and buck-boost configurations. For example, boost and buck-boost configurations can be achieved by opening and closing switches 126 and 128 instead of switches 122 and 124 as described in the buck configuration of the buck-boost converter 100.

In accordance with the above description of FIG. 1, when disconnecting one or more LED assemblies, some current control circuits, such as the control circuits described above with various drawbacks, may operate to maintain the switches in the second configuration past the point where controller 105 would adjust the switches to be in the first configuration to maintain output voltage 134 at a desired level. Maintaining the switches in the second configuration allows inductor 110 to continue to drive current through output resistor 132. As described above, as this process continues, the stored energy in inductor 110 decreases, thereby reducing the current supplied to output resistor 132 and reducing output voltage 134. Once output voltage 134 reaches the new desired level, or once the current level through inductor 110 reaches the new desired amount, a micro-controller, may operate to disconnect one or more of LED assemblies 102 (in addition to reverting to normal switching operation). However, the time taken by this discharging procedure to complete is typically not controlled. Accordingly, as noted previously, the time to discharge to the desired level can turn out to be long enough to cause a noticeable dimming of the lights of the LED chain during the discharge.

Accordingly, in some examples according to techniques of the present disclosure, it may be beneficial to further include a feedforward control element, such as feedforward control element 160. Including feedforward control element 160 may decrease the time required to adjust the current supplied to output resistor 132, and, hence, output voltage 134.

Figure 2:
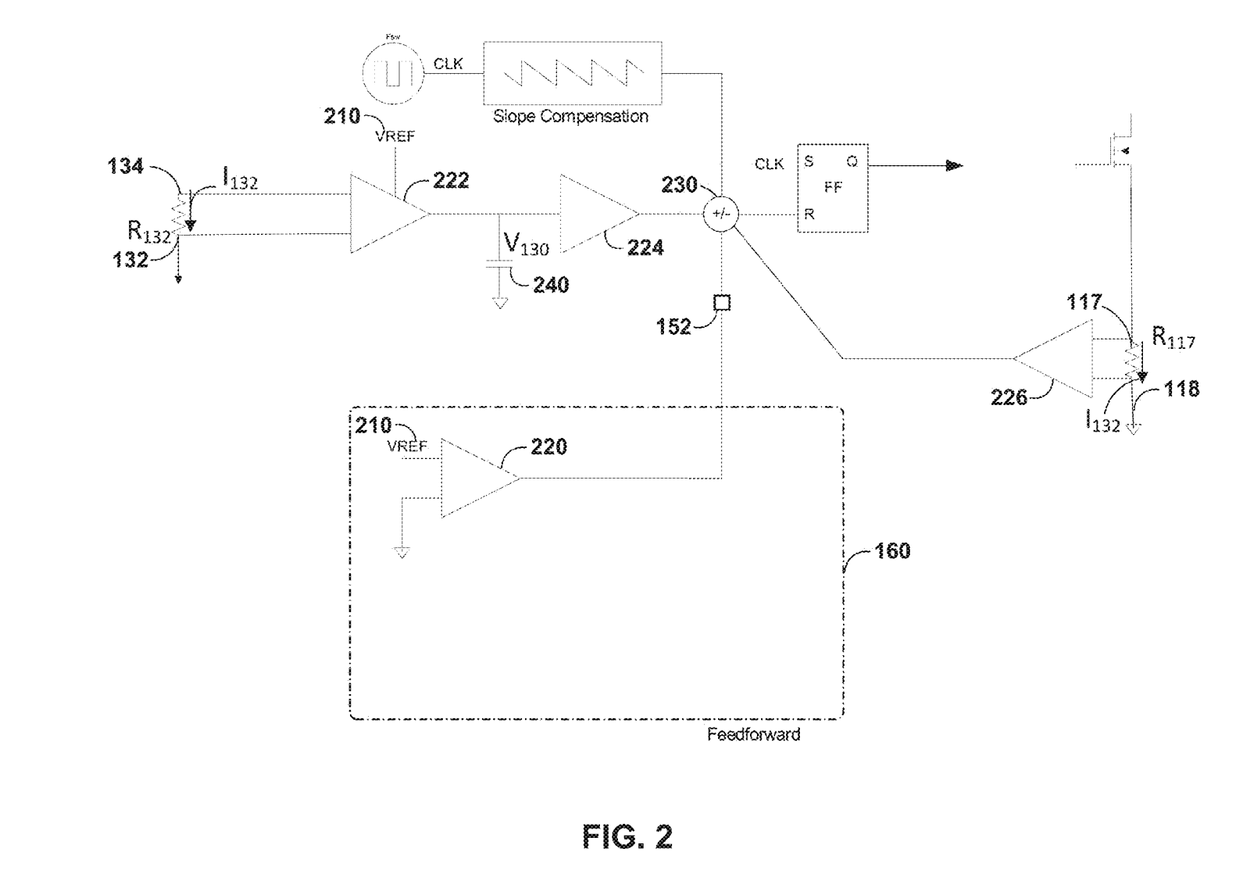
FIG. 2 is a block diagram illustrating an example of a buck configuration of the buck-boost converter including a feedforward control element, in accordance with techniques of this disclosure.

FIG. 2 is a block diagram illustrating an example of a feedforward control element configured for use in the buck configuration of the buck-boost converter 100. In at least one example of the switched mode converter, specifically the buck configuration of the buck-boost converter 100 of FIG. 2, the converter includes feedforward control element 160. As illustrated in FIG. 2, feedforward control element 160 may comprise an amplifier 220, which may be an error amplifier in some examples. Other examples of feedforward control element 160 may comprise additional amplifiers, amplifiers other than error amplifiers, or other circuit elements. In some examples, amplifier 220 may be connected to a reference voltage, such as VREF 210, and to ground. The circuit of FIG. 2 may also include a second amplifier, such as amplifier 222, also connected to VREF 210. In some examples amplifier 222 may also comprise an error amplifier. The circuit of FIG. 2 may additionally comprise compensating capacitor 240, amplifier 224, and amplifier 226. Amplifier 226 may operate to sense the current flowing through sense resistor 117. Each of amplifiers 220, 224, and 226 may be connected to sum node 230.

In a first example operation of the circuit illustrated in FIG. 2, additional LED chain assemblies 102 may be connected to output resistor 132. In this example, controller 105 may operate to apply an increase to VREF 210, which changes the value of VREF 210 applied to amplifiers 220 and 222. Amplifier 222 may compare this new, higher, VREF 210 voltage to output voltage 134 (as can be seen in FIG. 2, output voltage 134 is an input to amplifier 222). In this first example, the new VREF 210 is greater than output voltage 134, and amplifier 222 generates current to charge up compensating capacitor 240. Amplifier 224 may operate to provide the voltage across compensating capacitor 240 to sum node 230. In some examples amplifier 224 maybe provide gain to the voltage across compensating capacitor 240 before providing the voltage to sum node 230. In this example, feedforward control element 160 may further add the change in VREF 210 at sum node 230. For example, the change in VREF 210 may cause amplifier 220 to provide an instantaneous addition of a quantity of voltage proportional to the change in VREF 210 to sum node 230. This change in sum node 230 level causes the current through sense resistor 117 and inductor 110 (because of the connection between sense resistor 117 and inductor 110) to increase by the same quantity.

Because the current through sense resistor 117 is related to the current through output resistor 132 (and hence output to LED assemblies 102), due to the configuration of buck-boost converter 100, the current through output resistor 132 also increases. This in turn causes an increase in output voltage 134. This increase in output voltage 134 brings output voltage 134 closer to the new VREF 210 voltage value, thereby providing a feedback mechanism to bring the circuit back to a steady state at a higher output voltage 134 value. This higher output voltage 134 results in an increased current flow through LED assemblies 102. In an alternative example, once controller 105 has determined that output voltage 134 is at the new desired level, controller 105 may then send a signal to LS-MOSFETS 104 to connect additional LED chain assemblies 102 to output resistor 132.

The operation of this control circuit with feedforward control element 160 may be contrasted to those control circuits without feedforward control element 160. For example, in other circuits without feedforward control element 160, the change supplied to sum node 230 due to the increase in VREF 210 may occur more slowly as it may take time for amplifier 222 to supply current to charge compensating capacitor 240. Accordingly, the addition of feedforward control element 160 allows for providing the change in VREF 210, or a quantity proportional to VREF 210, more quickly to sum node 230.

The addition of feedforward control element 160 no longer limits the response of the circuit of FIG. 2 to a change in VREF 210 to the constraints of the bandwidth of compensating capacitor 240. Accordingly, including a feedforward control element, such as feedforward control element 160, may decrease the amount of time needed to safely connect or disconnect one or more LED assemblies 102 after adjusting VREF 210. In some examples that include a feedforward control element, a controller may send a signal to adjust VREF 210 and the signal to connect or disconnect one or more LED assemblies 102 simultaneously or substantially simultaneously.

The above example was described with respect to providing an increased VREF 210 relative to output voltage 134. In a second example, controller 105 may operate to disconnect one or more LED chain assemblies 102. In this example, controller 105 may supply a decrease in the value of VREF 210. In this second example, VREF 210 may be less than output voltage 134 and amplifier 222 may operate to draw current from compensating capacitor 240. This may then reduce the voltage supplied to amplifier 224 and consequently sum node 230. As with the first example, amplifier 220 may operate to subtract voltage from sum node 230 by a quantity equal or proportional to the change in VREF 210 in a manner more quickly than decreasing the voltage level of compensating capacitor 240 (which in turn subtracts voltage from sum node 230 through amplifier 224). This change in voltage provided to sum node 230 may then force the current through sense resistor 117 and inductor 110 (because of the connection between sense resistor 117 and inductor 110) to decrease by the same, or a proportional, quantity. As with the first example, this adjustment to the current through sense resistor 117 causes a decrease in current through 132 and lowers output voltage 134. This may operate to bring output voltage 134 closer to the new VREF 210 voltage value and eventually bring the circuit of FIG. 2 back to a steady state.

The above description of FIG. 2 illustrates in a general sense the relationship between the various depicted circuit elements. The following description describes the relationships more specifically by relating the various elements, voltages, and currents through equations.

Initially, controller 105 adjusts the switches between the first and second configurations (i.e. switches 122 and 124 are alternately opened-closed and closed-opened), when:

$$I_{117} * R_{117} = V_{REF} * A_{feedforward} + V_{240} * G_{224} \qquad (1)$$

$I_{132}$ represents the current flowing through $R_{117}$, $V_{REF}$ represents the supplied voltage VREF 210. $A_{feedforward}$ represents a factor applied by amplifier 220 to modify voltage VREF 210 before providing the voltage to sum node 230. $V_{130}$ represents the voltage across capacitor 130 and $G_{224}$ represents the gain applied to $V_{130}$ by amplifier 224.

When changing VREF 210, as long as the change is large enough, and compensating capacitor 240 is large enough, the change in the equation is simplified to:

$$\Delta I_{117} * R_{117} = \Delta V_{REF} * A_{feedforward} \qquad (2)$$

In some examples, $A_{feedforward}$ may be chosen to be proportional to $R_{117}$ and $R_{132}$, such as:

$$A_{feedforward} = R_{117}/R_{132} \qquad (3)$$

If we substitute in this relationship to equation (2), equation (2) may be simplified to:

$$\Delta I_{117} = \Delta V_{REF}/R_{132} \qquad (4)$$

In the buck configuration of buck-boost converter 100, all of the current through inductor 110 (which is equal to the current through sense resistor 117 as described previously) is delivered to the output resistor 132 and the load (i.e. LED chain assemblies 102):

$$\Delta I_{117} = \Delta I_{132} \qquad (5)$$

Finally, the current through the LED chain assemblies may be expressed as a voltage over a resistance through Ohm's Law (I=V/R). Accordingly:

$$\Delta I_{132} = \Delta V_{REF}/R_{132} \qquad (6).$$

As may be seen through these equations, by choosing $A_{feedforward} = R_{117}/R_{132}$, when a change to VREF 210 is applied to the circuit, the current through LED chain assemblies 102 changes as a factor of $R_{132}$, such that an output current that is equal to $\Delta I_{132} = \Delta V_{REF}/R_{132}$ is achieved. These relationships may be further understood in the context of FIG. 3.

Figure 3:
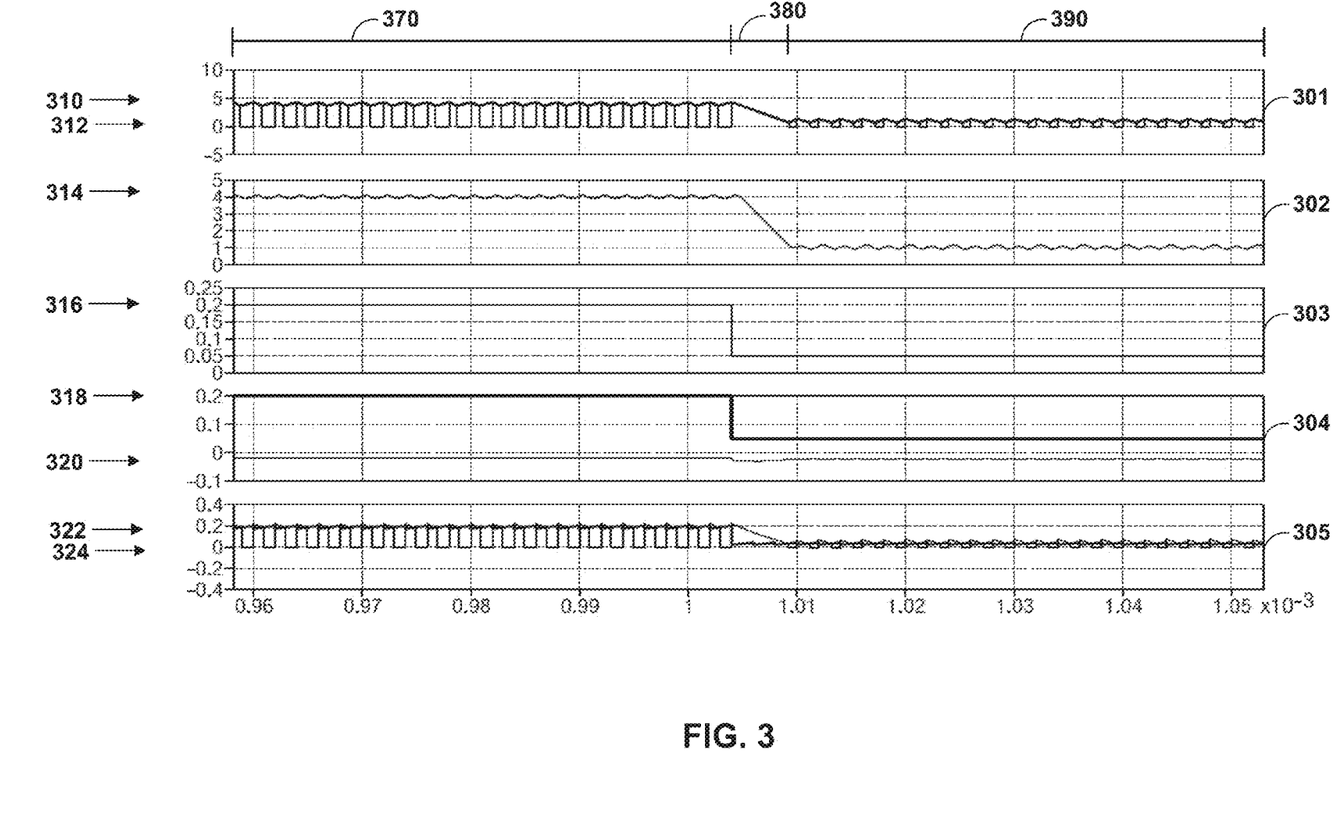
FIG. 3 is a graphical illustration depicting five separate graphical windows displaying voltage and current waveforms before, during, and after an adjustment to a reference voltage is applied to the circuit depicted in FIG. 2.

FIG. 3 depicts five separate graphical windows 301-305 displaying various voltage and current waveforms before, during, and after controller 105 applies a change to VREF 210. These voltage and current waveforms represent the voltage across and currents through some of the various circuit elements depicted in FIG. 2, as explained in more detail below. These waveforms help in illustrating the relationships between the circuit elements of FIG. 2 and the change in the circuit when controller 105 applies a change to VREF 210.

Beginning with window 303 of FIG. 3, illustrated voltage waveform 316 corresponds to VREF 210. As seen in the first section, section 370, VREF 210 starts at a value of 0.2V. At the beginning of section 380, controller 105 adjusts VREF 210 to a value of 0.05V and maintains this voltage through section 390.

Window 301 of FIG. 3 depicts two separate current waveforms 310 and 312. Current waveform 310 represents the current flowing through inductor 110 and current waveform 312 represents the current flowing through sense resistor 117. Since current flowing through inductor 110 also flows through output resistor 132, current waveform 310 also represents the total current provided to connected LED assemblies 102. Windows 301-305 are also broken up into three sections, section 370, section 380, and section 390. Section 370 represents the portion of the waveforms when the circuit is in a steady state. Current waveform 312 depicts the switching nature of buck-boost converter 100 described with respect to FIG. 1. When the switches are in the second configuration and current is flowing through sense resistor 117, current waveform 312 equals current waveform 310. During this period of operation, both current waveforms 310 and 312 are decreasing as the stored energy in inductor 110 is being used up because inductor 110 is driving current to output resistor 132 in this configuration. Conversely, when the switches are switched to the first configuration, there is no current flowing through sense resistor 117 and current waveform 312 is at 0. Also during the first switch configuration, current waveform 310 is increasing and inductor 110 is again storing energy.

At the moment controller 105 adjusts VREF 210 to the new value, or a micro-controller requiring controller 105 to adjust VREF 210 to the new value, which is at the beginning of section 380, window 301 illustrates the changes to current waveforms 310 and 312. At the moment the change in VREF 210 occurs, the current flowing through inductor 110 (depicted by current waveform 310) and the current flowing through sense resistor 117 (depicted by current waveform 312) are equal and begin to decrease. Current waveforms 310 and 312 continue to decrease through section 380 until reaching a new steady state value at the beginning of section 390. Once this new value is reached, controller 105 may resume normal switching operations of switches 122 and 124, which can be seen in waveforms 310 and 312 throughout section 390.

Window 302 of FIG. 3 depicts current waveform 314, which corresponds to the current flowing through output resistor 132 and to connected LED chain assemblies 102. As described above, while in the buck configuration of the buck-boost converter 100, this current is related to the current flowing through inductor 110, filtered by the capacitor 130, and this correlation is illustrated by the similarity between current waveforms 314 and 310. Current waveform 314 follows a similar wave pattern during steady state times in sections 370 and 390 and shows a decrease upon controller 105 changing VREF 210 to a lower value.

Window 304 of FIG. 3 depicts two voltage waveforms 318 and 320. Voltage waveform 318 represents the voltage output of amplifier 220 of FIG. 2, which is VREF 210 modified by a factor $A_{feedforward}$. In this illustrative example, factor $A_{feedforward}$ has been set to one so that voltage waveform 318 corresponds exactly to voltage waveform 316. Voltage waveform 320 represents the voltage output of amplifier 224 of FIG. 2, which is the difference across compensating capacitor 240 and any gain supplied by amplifier 224. Voltage waveform 320 depicts very little variation immediately after the controller 105 applies the change to VREF 210 indicating that compensating capacitor 240 does not have a great affect on the system. In a conventional system, without a feedforward control element, voltage waveform 320 may initially be at 0.2V and then discharge down to 0.05V after controller 105 supplies the change in VREF 210. This discharge would affect the time for the system to decrease the current flowing through inductor 110 and output resistor 132 (i.e. elongating the amount of time required for current waveforms 310, 312, and 314 to decrease). Accordingly, voltage waveform 320 illustrates that the transition by the system is not limited by the bandwidth, or rate of discharge, of compensating capacitor 240, as in a conventional system. Rather, the system is limited by the discharging of inductor 110, which occurs at a faster rate than the discharging of compensating capacitor 240. As described above, this difference may eliminate a number of the drawbacks of the conventional system.

Figure 4:
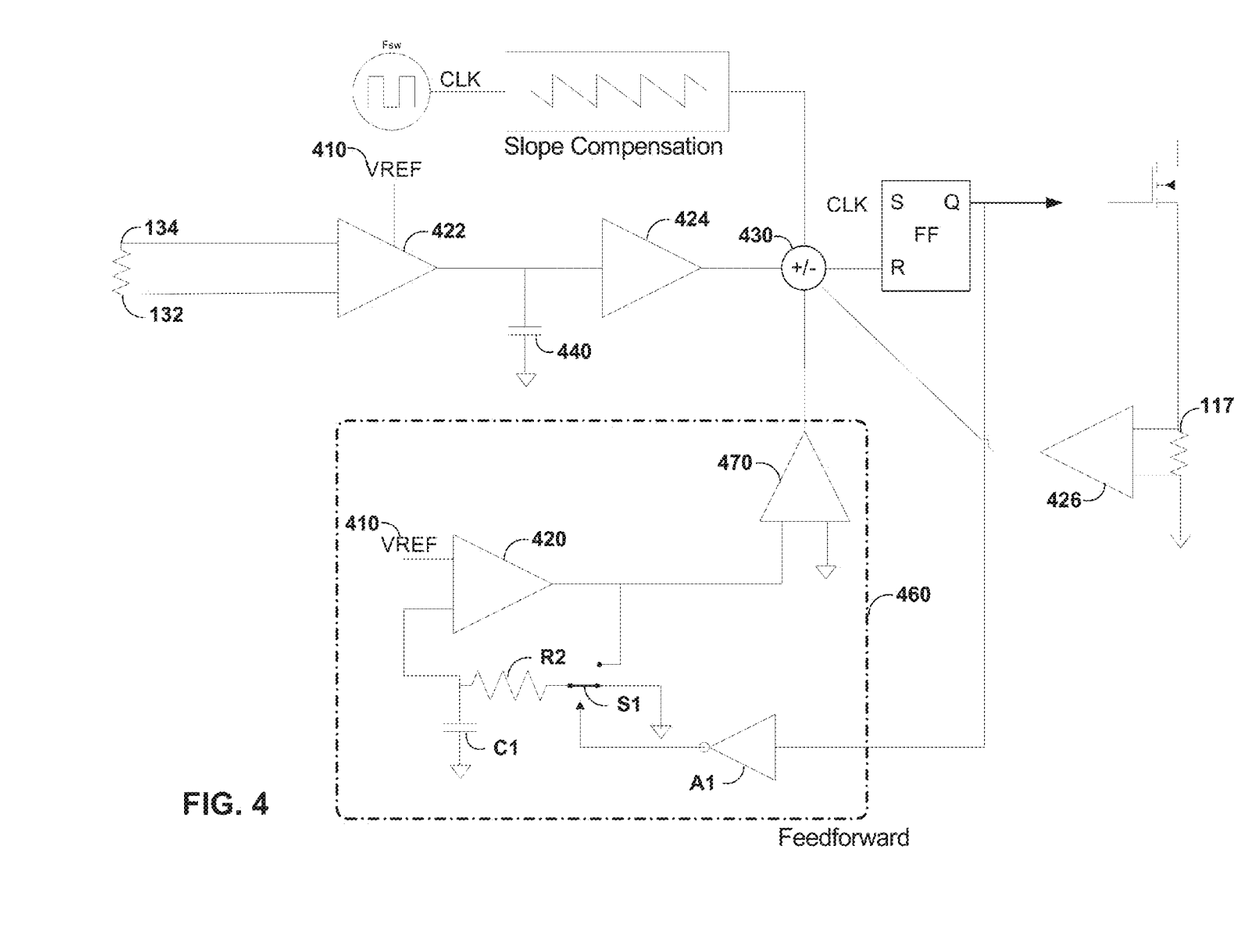
FIG. 4 is a block diagram illustrating a boost configuration of the buck-boost converter including a feedforward control element, in accordance with the techniques of this disclosure.

FIG. 4 is a block diagram illustrating an example of feedforward control element 460 configured to operate with a boost configuration of buck-boost converter 100, in accordance with the techniques of this disclosure. In contrast to the relationship described above with respect to the circuit of FIG. 2, the current flowing through output resistor 132 in the circuit of FIG. 4 is not exactly equal to the current flowing through inductor 110. Rather, the current flowing through output resistor 132 is a fraction of the current flowing through inductor 110. Accordingly, adjusting the current flowing through output resistor 132, and consequently the load (e.g. LED assemblies 102), to a new desired level requires an adjustment to the reference voltage multiplied by the fraction instead of solely an adjustment to the reference voltage. The relationships between the various circuit elements depicted in FIG. 4 are explained in more detail below.

In at least one example of the switched mode converter, specifically the boost configuration of the buck-boost converter 100 of FIG. 4, the converter comprises output resistor 132, compensating capacitor 440, and sum node 430. Output resistor 132 may represent output resistor 132 depicted in FIG. 1. FIG. 4 also contains amplifier 422, amplifier 424, amplifier 426, amplifier 470, and amplifier 420. Amplifiers 422, 424, and 426 and compensating capacitor 440 may operate in a similar manner to amplifiers 222, 224, and 226 and compensating capacitor 240 of FIG. 2. For example, amplifier 422 may compare VREF 410 to output voltage 134. Based on this comparison, amplifier 422 may drive current to compensating capacitor 440, thereby charging it, or amplifier 422 may draw current from compensating capacitor 440, thereby discharging it. Amplifier 424 may provide the voltage across compensating capacitor 440 to sum node 430 and, in some examples, may provide gain to the voltage before providing it to sum node 430. Amplifier 426 may operate to sense the current flowing through sense resistor 117. Each of amplifiers 470, 424, and 426 may be connected to sum node 430.

In the boost converter configuration, the relationship between the current flowing through output resistor 132 and the current flowing through inductor 110 is:

$$\Delta I_{132} = \Delta I_{Inductor} * (1-D) \quad (7)$$

$I_{Inductor}$ represents the current flowing through inductor 110, D represents the duty cycle of the circuit, and $\Delta I_{132}$ represents the current flowing through output resistor 132. Accordingly, in order to affect a desired change to the current through output resistor 132, controller 105 needs to adjust the current through inductor 110 by a factor of $\Delta I_{132}/(1-D)$ (as outlined in the following equation):

$$\Delta I_{inductor} = \Delta I_{132}/(1-D) \quad (8)$$

The $\Delta I_{132}$ in the equation represents the desired change in the current through output resistor 132.

Because of the unequal currents, it may not be sufficient to merely provide the change in $V_{REF}$ by feedfoward element 460 to sum node 430 in order to change $I_{132}$ to the desired level. The following equations describe the change in voltage necessary to be supplied to sum node 430 to effectuate the desired change in $I_{132}$ As described previously with respect to FIG. 2, controller 105 may operate to adjust the configuration of switches 122, 124, 126, and 128 when:

$$\Delta I_{Inductor} * R_{117} = \Delta V^* * A_{feedforward} \quad (9)$$

Additionally, in some examples, the $A_{feedforward}$ factor for feedforward control element 460 may be:

$$A_{feedforward} = R_{117}/R_{132} \quad (10)$$

Accordingly, equation (9) may then simplify to:

$$\Delta I_{Inductor} = \Delta V^*/R_{132} \quad (11)$$

In the above equations, $\Delta V^*$ is the change in voltage to sum node 430 required to effectuate the desired change in current through output resistor 132 ($I_{132}$). Combining equation (11) with equation (7) results in:

$$\Delta V^* = (\Delta I_{132} * R_{132})/(1-D) \quad (12)$$

Finally, as $\Delta I_{132} = \Delta V_{REF}/R_{132}$, $\Delta V^*$ may be expressed as:

$$\Delta V^* = \Delta V_{REF}/(1-D) \quad (13)$$

Accordingly, when adjusting the voltage supplied to sum node 430 in order to effectuate a desired change in the current through output resistor 132, $V_{REF}$ must be modified by $1/(1-D)$.

FIG. 4 depicts one example of feedfoward control element 460 for modifying a change in $V_{REF}$ by $1/(1-D)$ before providing the voltage to the amplifier 470 and then to sum node 430. In some examples, feedfoward element 460 may include an analog closed loop divider to generate $V^*$. In some examples, the closed loop divider may comprise inverter A1, switch S1, and resistor R2. In other examples, the close loop divider may comprise resistor R1 and capacitor C2 between the output of amplifier 420 and the input of amplifier 470 to generate a filter for stability of the system. Based on the configuration of the elements as depicted in FIG. 4, the output of amplifier 420 is modulated by the switch S1 with a pulse width modulation signal that has a duty cycle equal to (1-D), where the duty cycle (1-D) is generated by the complementary signal of the duty cycle by the inverter A1. The modulated signal is filtered by resistor R2 and capacitor C1. Due to the closed loop the value of the modulated signal is equal to VREF 410. In the boost converter configuration, the relationship between the output of amplifier 420 and the VREF 410 generated by the duty cycle:

$$V_{420}*(1-D)=V_{REF} \quad (14)$$

Accordingly, to determine the output of amplifier 420:

$$V_{420}=V_{REF}/(1-D) \quad (15)$$

The closed loop divider causes VREF 410 to be multiplied by the factor 1/(1−D). In this way feedfoward control element 460 may operate with a boost converter to apply a change in voltage to sum node 430 in order to change the current flowing through output resistor 132 by the desired amount. As with the feedfoward control element 160 configured for the buck configuration, the addition of feedforward control element 460 causes the adjustment to the current flowing through output resistor 132 to occur at a faster rate than in a conventional circuit, such as one without feedfoward control element 460.

Figure 5:
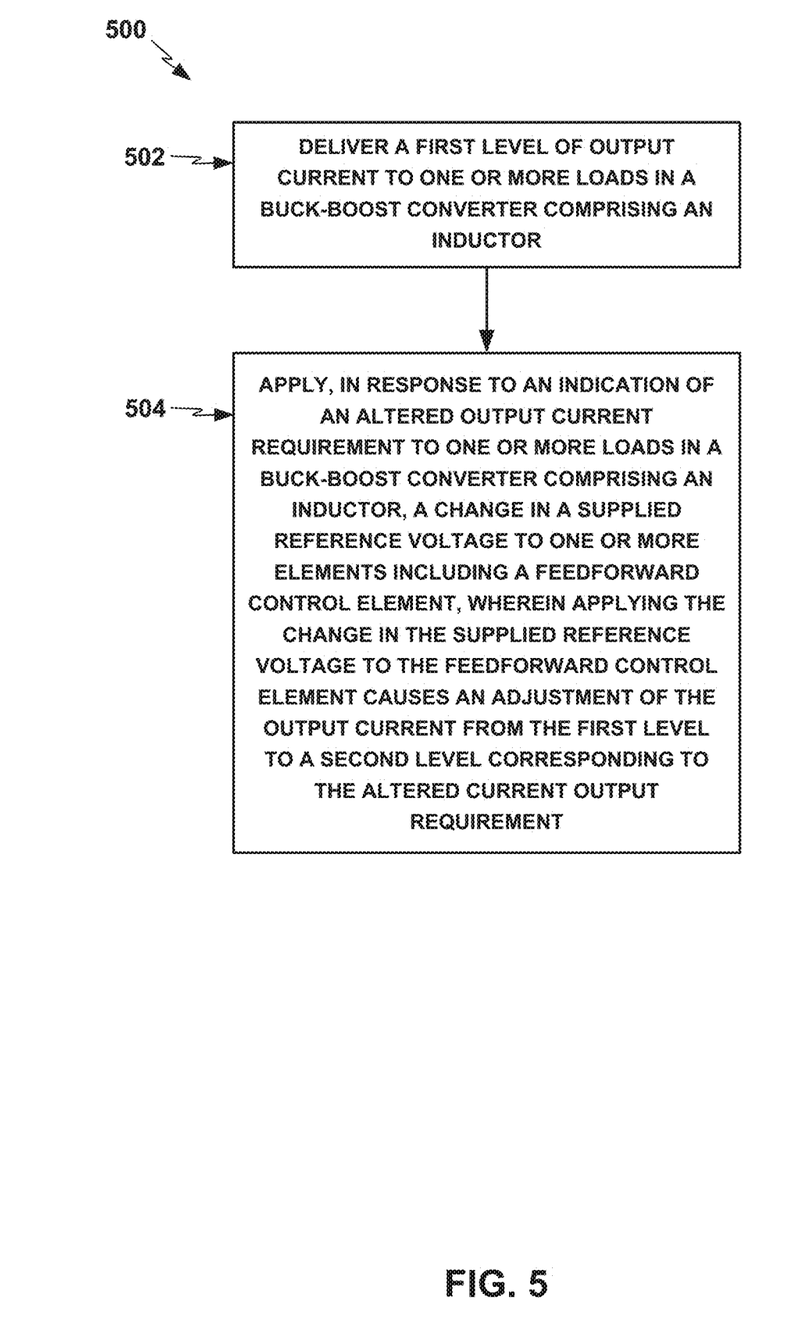
FIG. 5 is a flow chart illustrating a method of feedforward control, in accordance with the examples of this disclosure.

FIG. 5 is a flowchart illustrating a method 500 of feedforward control, in accordance with the examples of this disclosure. In some examples, a circuit, such as the circuits described above with respect to FIGS. 1-3, may operate to perform method 500. The method will be described with respect to the circuit depicted in FIG. 2, but other circuits that include different or more circuit elements may operate to perform method 500. For example, the circuit of FIG. 2 may deliver a first level of output current to one or more loads in a buck-boost converter comprising an inductor (502). With respect to FIG. 2, the one or more loads may be LEDs such as LED assemblies 102, as depicted in FIG. 1.

At some moment, the circuit, specifically a controller, such as controller 105 of FIG. 1, may receive an indication to connect or disconnect one or more loads—which in turn indicates an altered output current requirement (increasing the output current requirement in the case of connecting one or more additional loads and decreasing the output current requirement in the case of disconnecting one or more loads). In some examples, this indication may originate from an external switch which may control the light configuration (such as whether the lights are in a "running light" configuration, an "on" configuration, or an "off" configuration). The controller may then apply, in response to an indication of an altered output current requirement to one or more loads in a buck-boost converter comprising an inductor, a change in a supplied reference voltage to one or more elements including a feedforward control element, wherein applying the change in the supplied reference voltage to the feedforward control element causes an adjustment of the output current from the first level to a second level corresponding to the altered current output requirement (504). For example, the controller may change the reference voltage supplied to one or more amplifiers, such as amplifiers 220 and 222 of FIG. 2. At least one of the amplifiers may be a part of a feedforward control element. The feedforward control element may then provide this altered voltage to a node, such as sum node 230 of FIG. 2. In some examples, the feedforward control element may modify the altered voltage before providing the voltage to a node. This provided voltage forces the output current to increase or decrease to a second level, for example, depending on whether the controller increased or decreased the supplied reference voltage.

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

Various examples of the techniques of the present disclosure have been described. These and other examples are within the scope of the following claims.

The invention claimed is:

1. A method comprising:
   delivering a first level of output current to one or more loads in a switched mode converter comprising an inductor; and
   applying, in response to an indication of an altered output current requirement to one or more loads in the switched mode converter comprising an inductor, a change in a supplied reference voltage to one or more elements including a feedforward control element comprising an error amplifier,
   wherein applying the change in the supplied reference voltage to the feedforward control element causes the feedforward control element to apply a voltage proportional to the change in the supplied reference voltage at a node of a controller, and wherein the voltage applied by the feedforward control element at the node of the controller causes an adjustment of the output current from the first level to a second level corresponding to the altered current output requirement.

2. The method of claim 1, wherein the change in the supplied reference voltage also causes a change in the voltage level of a compensating capacitor, wherein the change in the voltage level of the compensating capacitor does not affect the rate of change of the output current from the first level to the second level.

3. The method of claim 1, wherein after applying the change in the supplied reference voltage, the rate of change of the output current is limited by the inductor.

4. The method of claim 1, wherein the switched mode converter is a buck-boost converter, further comprising:
   applying, in response to the indication of the altered output current requirement to the one or more loads in the buck-boost converter comprising the inductor, the change in the supplied reference voltage to the one or more elements including a summing node,
      wherein applying the change in the supplied reference voltage to the summing node causes the change and adjustment of the output current from the first level to the second level corresponding to the altered current output requirement.

5. The method of claim 1, wherein the feedforward control element comprises a closed loop divider.

6. The method of claim 1, wherein the output current level is equal to the current level flowing through the inductor.

7. The method of claim 1, wherein the output current level is equal to the current level flowing through the inductor multiplied by a factor of approximately (1−D), wherein D represents a duty cycle.

8. The method of claim 7, wherein the feedforward control element multiplies the change in the supplied reference voltage by a factor of approximately:

$$1/(1-D),$$

wherein D represents the duty cycle.

9. The method of claim 1, further comprising:
applying, in response to the indication of the altered output current requirement to the one or more loads in the switched mode converter comprising the inductor, the change in the supplied reference voltage to one or more elements including a second error amplifier;
wherein applying the change in the supplied reference voltage to the second error amplifier forms a feedback loop, and wherein the applying the change in the supplied reference voltage to the feedforward control element forms a feedforward loop.

10. A device comprising:
a feedforward control element comprising an error amplifier; and
one or more components configured to apply, in response to an indication of an altered output current requirement of one or more loads in a switched mode converter comprising an inductor, a change in a supplied reference voltage to one or more elements including the feedforward control element,
wherein when the one or more components apply a change in the supplied reference voltage to the feedforward control element causes the feedforward control element to apply a voltage proportional to the change in the supplied reference voltage at a node of a controller, and wherein the voltage applied by the feedforward control element at the node of the controller causes an adjustment of an output current from a first level to a second level corresponding to the altered current output requirement.

11. The device of claim 10, further comprising a compensating capacitor, wherein the change in the supplied reference voltage also causes a change in the voltage level of the compensating capacitor, wherein the change in the voltage level of the compensating capacitor does not affect the rate of change of the output current from the first level to the second level.

12. The device of claim 10, wherein when the one or more components apply a change in the supplied reference voltage, the rate of change of the output current is limited by the inductor.

13. The device of claim 10, further comprising:
a summing node; and
the one or more components configured to apply, in response to the indication of the altered output current requirement of the one or more loads in the switched mode converter comprising the inductor, the change in the supplied reference voltage to the one or more elements including the summing node,
wherein when the one or more components apply the change in the supplied reference voltage to the summing node, the summing node causes the adjustment of the output current from the first level to the second level corresponding to the altered current output requirement.

14. The device of claim 10, wherein the feedforward control element comprises a closed loop divider.

15. The device of claim 10, wherein the output current is equal to the current flowing through the inductor.

16. The device of claim 10, wherein the output current is equal to the current flowing through the inductor multiplied by a factor of approximately (1−D), wherein D represents a duty cycle.

17. The device of claim 16, wherein the feedforward control element multiplies the change in the supplied reference voltage by a factor of approximately:

$$1/(1-D),$$

wherein D represents the duty cycle.

18. The device of claim 10, further comprising:
a second error amplifier, wherein the one or more components are configured to apply, in response to the indication of the altered output current requirement to the one or more loads in the switched mode converter comprising the inductor, the change in the supplied reference voltage to the second error amplifier;
wherein the one or more components and the second error amplifier form a feedback loop, and wherein the one or more components and the feedforward control element form a feedforward loop.

19. A circuit comprising:
a feedforward control element comprising an error amplifier; and
one or more components configured to apply, in response to an indication of an altered output current requirement of one or more loads in a switched mode converter comprising an inductor, a change in a supplied reference voltage to one or more elements including the feedforward control element,
wherein when the one or more components apply a change in the supplied reference voltage to the feedforward control element causes the feedforward control element to apply a voltage proportional to the change in the supplied reference voltage at a node of a controller, and wherein the voltage applied by the feedforward control element at the node of the controller causes an adjustment of an output current level from a first current level to a second current level corresponding to the altered current output requirement.

20. The circuit of claim 19, further comprising a compensating capacitor, wherein the change in the supplied reference voltage also causes a change in the voltage level of the compensating capacitor, wherein the change in the voltage level of the compensating capacitor does not affect the rate of change of the output current from the first level to the second level.

21. The circuit of claim 19, wherein when the one or more components apply a change in the supplied reference voltage, the rate of change of the output current is limited by the inductor.

22. The circuit of claim 19, wherein the switched mode converter is a buck-boost converter, further comprising:
a summing node; and
the one or more components configured to apply, in response to the indication of the altered output current requirement of one or more loads in the buck-boost converter comprising the inductor, the change in the supplied reference voltage to one or more elements including the summing node,
wherein when the one or more components apply the change in the supplied reference voltage to the summing node, the summing node causes the adjustment of the output current level from the first current level to the second current level corresponding to the altered current output requirement.

23. The circuit of claim 19, further comprising:
a second error amplifier, wherein the one or more components are configured to apply, in response to the indication of the altered output current requirement to the one or more loads in the switched mode converter comprising the inductor, the change in the supplied reference voltage to the second error amplifier;
wherein the one or more components and the second error amplifier form a feedback loop, and wherein the one or more components and the feedforward control element form a feedforward loop.

* * * * *